(No Model.)

J. STARKEY & S. W. VERNIER.
THRASHING MACHINE.

No. 418,768.    Patented Jan. 7, 1890.

UNITED STATES PATENT OFFICE.

JOHN STARKEY AND SAMUEL W. VERNIER, OF MINERVA, OHIO.

THRASHING-MACHINE.

SPECIFICATION forming part of Letters Patent No. 418,768, dated January 7, 1890.

Application filed April 5, 1889. Serial No. 306,087. (No model.)

*To all whom it may concern:*

Be it known that we, JOHN STARKEY and SAMUEL W. VERNIER, citizens of the United States, residing at Minerva, in the county of Stark and State of Ohio, have invented certain new and useful Improvements in Thrashing-Machines; and we do hereby declare that the following is a full, clear, and exact description of the same, reference being had to the annexed drawings, making a part of this specification, and to the letters of reference marked thereon, in which—

Figure 1:
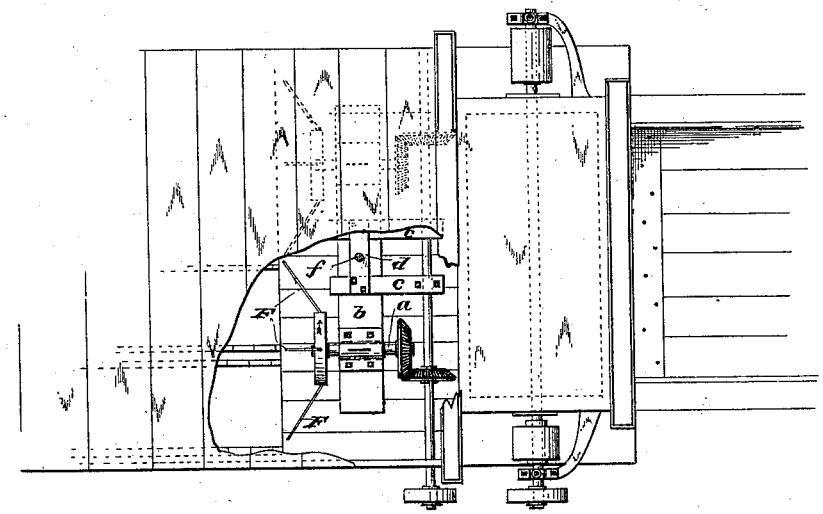
Figure 2:
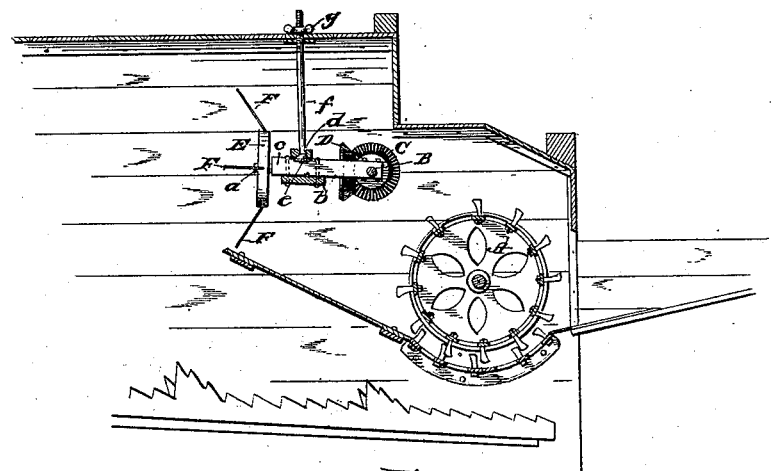

Figure 1 is a top view showing a portion of the cover broken away. Fig. 2 is a longitudinal section of a portion of the frame, showing parts properly attached.

The present invention has relation to thrashing-machines; and its nature consists in the different parts and combination of parts hereinafter described, and particularly pointed out in the claims.

Similar letters of reference indicate corresponding parts in all the figures of the drawings.

In the accompanying drawings, A represents the cylinder, which is constructed in the ordinary manner and journaled to a suitable frame. The shaft B is located substantially as shown in the drawings, and is provided with the beveled gear-wheels C, which are for the purpose of communicating rotary motion to the shafts $a$ by means of the beveled wheels D. The shafts $a$ are properly journaled to the bar $b$ by means of suitable boxes. To the rear ends of the shafts $a$ are securely attached the heads E, which heads are located substantially as shown in the drawings. These heads E are provided with the inclined fingers or arms F, which are located substantially as shown. To the bar $b$ are securely attached the arms $c$, which are journaled to the shaft B. To the arms $c$ is securely attached the cross-bar $d$, which is for the purpose of receiving and holding the head $e$ of the suspending bar or bolt $f$. The top or upper end of the suspending bar or bolt $f$ is screw-threaded to receive and hold the nut $g$, which is for the purpose of adjusting the heads E up or down, and at the same time securely holding said heads at any desired point of adjustment. The shafts $a$ are so geared that they will rotate in opposite directions, their top or upper portion rotating toward each other, thereby causing the heads E and the inclined fingers or arms F to move outward or away from each other as they pass below the shafts $a$.

It will be seen that as the straw passes under the inclined fingers or arms F it will be thrown crosswise to the ends of the thrashing-machine proper, and at the same time distributing the straw upon the separating device, thus leaving the straw and chaff in better position for separating the grain therefrom.

It will be seen that by our peculiar device a much wider separating device can be used than the length of the thrashing-cylinder A, thereby providing an increased amount of separating surface.

It will be seen that by our peculiar arrangement the inclined fingers or arms F can be adjusted to any desired point above the inclined board or platform H, thereby providing a means of regulating the work of the inclined fingers or arms F in different kinds of grain.

It will be seen that the fingers or arms F may, if desired, extend at right angles to the shafts $a$ and the same object be accomplished; but we prefer to incline said fingers, as the straw will better pass the fingers when they are inclined as illustrated in the drawings.

It will be understood that the ordinary separating device is to be properly attached together with the different parts belonging to a thrashing-machine. It will also be seen that by providing the rotating fingers or arms F the straw will be prevented from bunching, and thereby prevent the machine proper from choking.

Having fully described our invention, what we claim as new, and desire to secure by Letters Patent, is—

1. The combination of the shaft B, provided with the beveled gear-wheels C, the shafts $a$, having mounted thereon the beveled wheels D and the heads E, and the inclined fingers or arms F, substantially as and for the purpose specified.

2. The combination of the shafts $a$ and means for rotating said shafts, the arms $c$, attached to the shaft B, the suspending bar or bolt $f$, and the heads E, provided with the fingers or arms F, substantially as and for the purpose set forth.

In testimony that we claim the above we have hereunto subscribed our names in the presence of two witnesses.

JOHN STARKEY.
SAMUEL W. VERNIER.

In presence of—
WILLIAM H. TISHEL,
G. G. J. GREENWOOD.